(12) United States Patent  
Sharver

(10) Patent No.: US 7,686,270 B2  
(45) Date of Patent: Mar. 30, 2010

(54) COMPUTER SUPPORT DEVICE

(76) Inventor: Jon A. Sharver, 2016 Thrush Way, Fairfield, CA (US) 94533

( * ) Notice: Subject to any disclaimer, the term of this patent is extended or adjusted under 35 U.S.C. 154(b) by 8 days.

(21) Appl. No.: 11/975,559

(22) Filed: Oct. 22, 2007

(65) Prior Publication Data

US 2009/0101784 A1    Apr. 23, 2009

(51) Int. Cl.
*A47B 91/00* (2006.01)

(52) U.S. Cl. ................................... 248/349.1

(58) Field of Classification Search ............. 248/349.1, 248/346.03, 454, 455, 456, 457, 460, 462
See application file for complete search history.

(56) References Cited

U.S. PATENT DOCUMENTS

| | | | | |
|---|---|---|---|---|
| 3,199,826 A * | 8/1965 | Miller et al. | ................ | 248/417 |
| 4,566,664 A * | 1/1986 | Donald | ..................... | 248/349.1 |
| 6,474,614 B2 * | 11/2002 | MacEachern | ............. | 248/349.1 |
| 6,825,415 B1 * | 11/2004 | Chen et al. | .................... | 174/63 |
| 7,457,108 B2 * | 11/2008 | Ghosh | ................... | 361/679.27 |
| 2003/0001064 A1 * | 1/2003 | Book | ......................... | 248/460 |
| 2007/0131825 A1 * | 6/2007 | Skrodzki | ................. | 248/177.1 |

* cited by examiner

*Primary Examiner*—J. Allen Shriver, II
*Assistant Examiner*—Erin Smith
(74) *Attorney, Agent, or Firm*—Paul R. Martin

(57) ABSTRACT

Disclosed is a computer support device comprising a base, a rectangular support plate attached to the base in a manner that permits rotation of the support plate around a vertical axis in the center of the base, and a support construct that is moveably attached to the top surface of said support plate, wherein said construct is capable of being vertically elevated relative thereto.

3 Claims, 12 Drawing Sheets

COMPUTER SUPPORT DEVICE

BACKGROUND OF THE INVENTION (1) Field of the Invention

This invention relates to a portable device for use in supporting laptop computers, and similar products. More particularly, it relates to a portable device for use in supporting laptop computers that enables a laptop computer positioned thereon to moved in a horizontal rotational and vertical up and down manner.

(2) Description of Related Art

In recent years laptop computers have become the computer of choice for many consumers. They have become ubiquitous for salespeople who spend a lot of time on the road, as orders can be entered instantly, and sent back to headquarters for processing, thereby saving much time and effort for the sales people. Attorneys also use laptop computers during trials to record and recall testimony. It is believed that laptop computers will become the dominant computers in a few short years, as improvements are made in battery life, memory capability, and screen brightness. One of the problems with laptop computers, however, is that they are not always easy to use when a person is on the road. In airplanes, for example, the computers have to be placed on the fold down trays located in the back of the seat in front of the passenger. This often is unsatisfactory for the laptop user, as the space is cramped, and the laptops often are difficult to read, as the screen is not properly situated for easy visibility. Moreover, the key pads are flat, and sometimes are difficult to access in that position. The angle of the keyboard often needs to be adjusted for efficient usage, but this is impossible with present laptops. U.S. Pat. No. 7,252,040, Dumond, describes a portable table for laptop computers having legs which are adjustable in a lateral and vertical direction. However, this product is inadequate in that it does not allow rotational movement. Moreover, it does not permit adjustment of the angle of the laptop keyboard relative to a flat surface. What is needed is a portable device that the laptop computer, or similar product, can be placed on that allows rotational movement and adjustment of the angle of the laptop keyboard easily. The present invention does just that.

SUMMARY OF THE INVENTION

The present invention is directed to a portable computer support device that a laptop computer or similar product can be placed on that permits horizontal rotational movement and vertical movement of the laptop keyboard while it is positioned on the device. This is accomplished in the manner set forth below.

DESCRIPTION OF THE DRAWINGS

FIG. 10 B is a perspective view of an arm section of the device of the invention.

DETAILED DESCRIPTION OF THE PREFERRED EMBODIMENT

Figure 1:
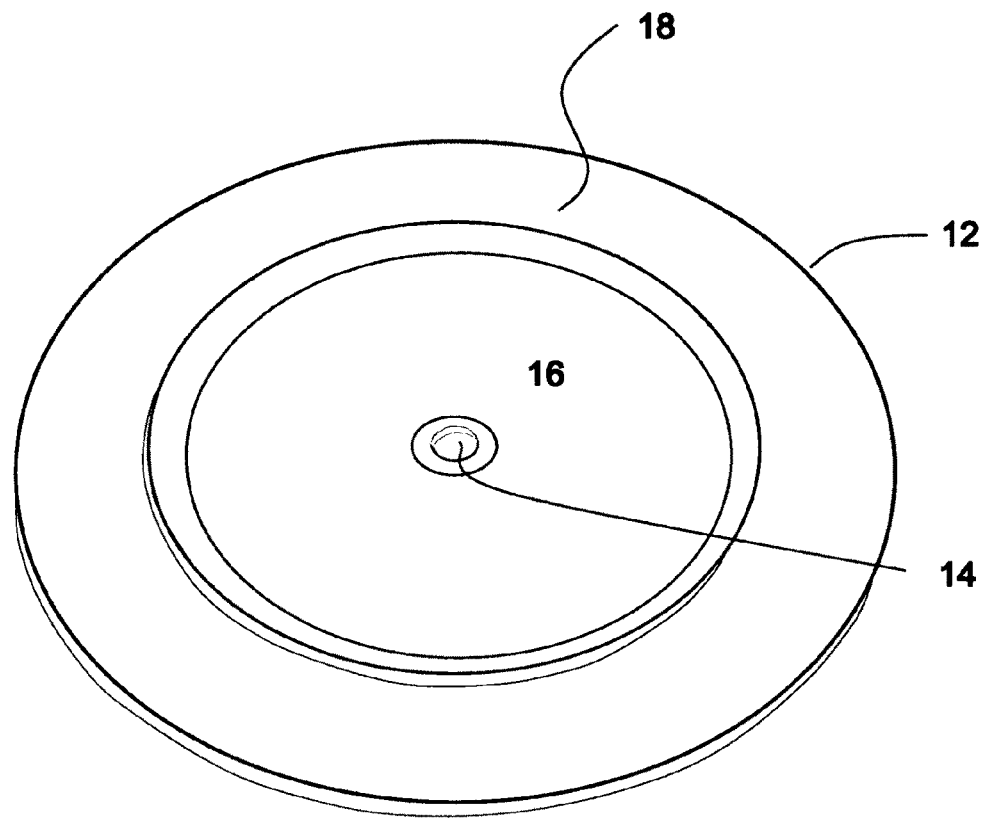
FIG. 1 is a perspective view of the top of the base plate.
Figure 11:
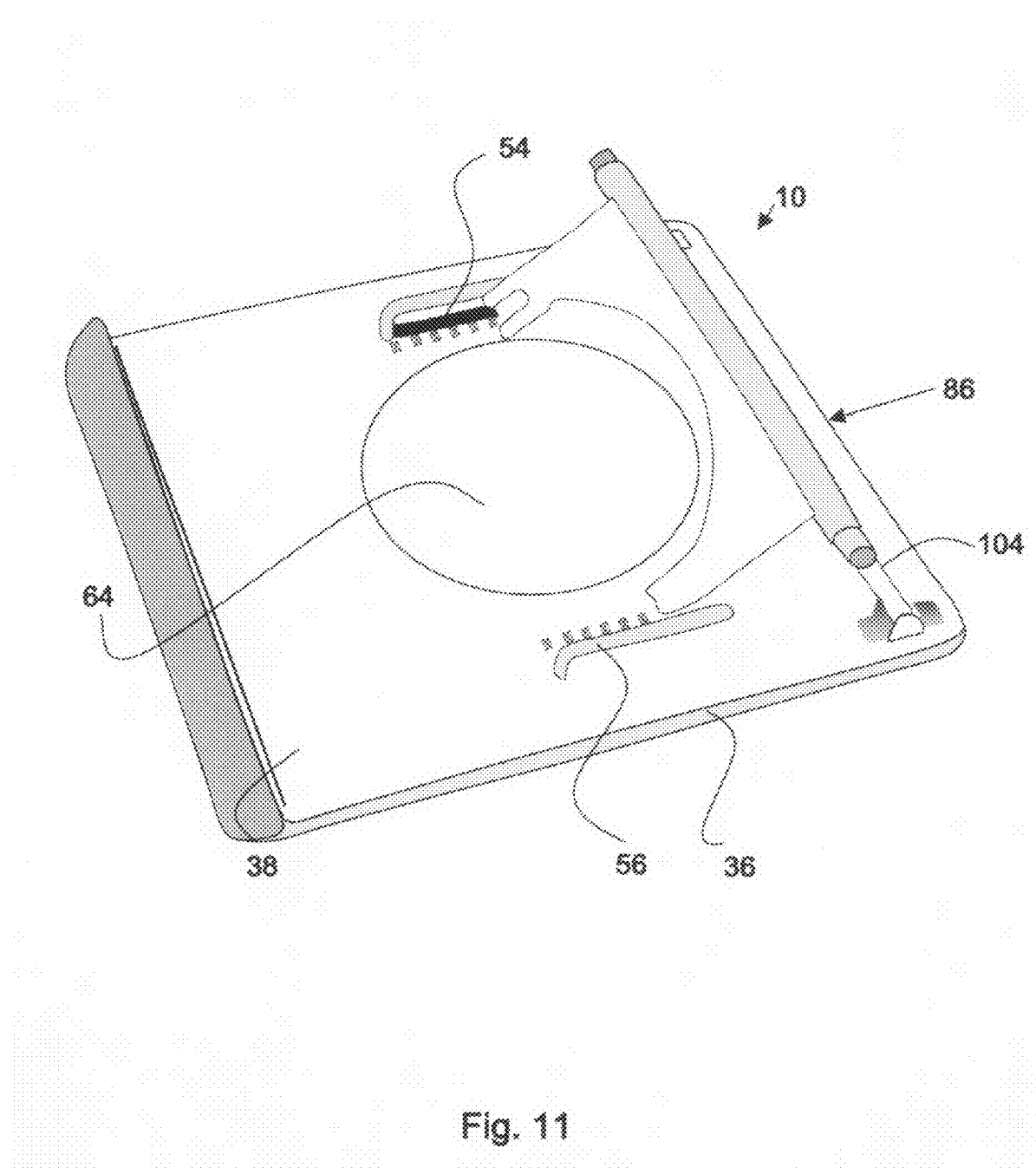
FIG. 11 is a perspective view from the top of the device of the invention.

The laptop computer support device 10 of this invention is shown in its entirety in FIG. 11. It comprises several parts which interact together. As seen in FIG. 1, the first part (not seen in FIG. 11) is a circular base plate 12. The base plate 12 is preferably made of molded plastic, but can also be made of metal or wood. The base plate 12 has a hole 14 in the middle having a diameter sufficient for a screw or bolt to be inserted through it.

Figure 2:
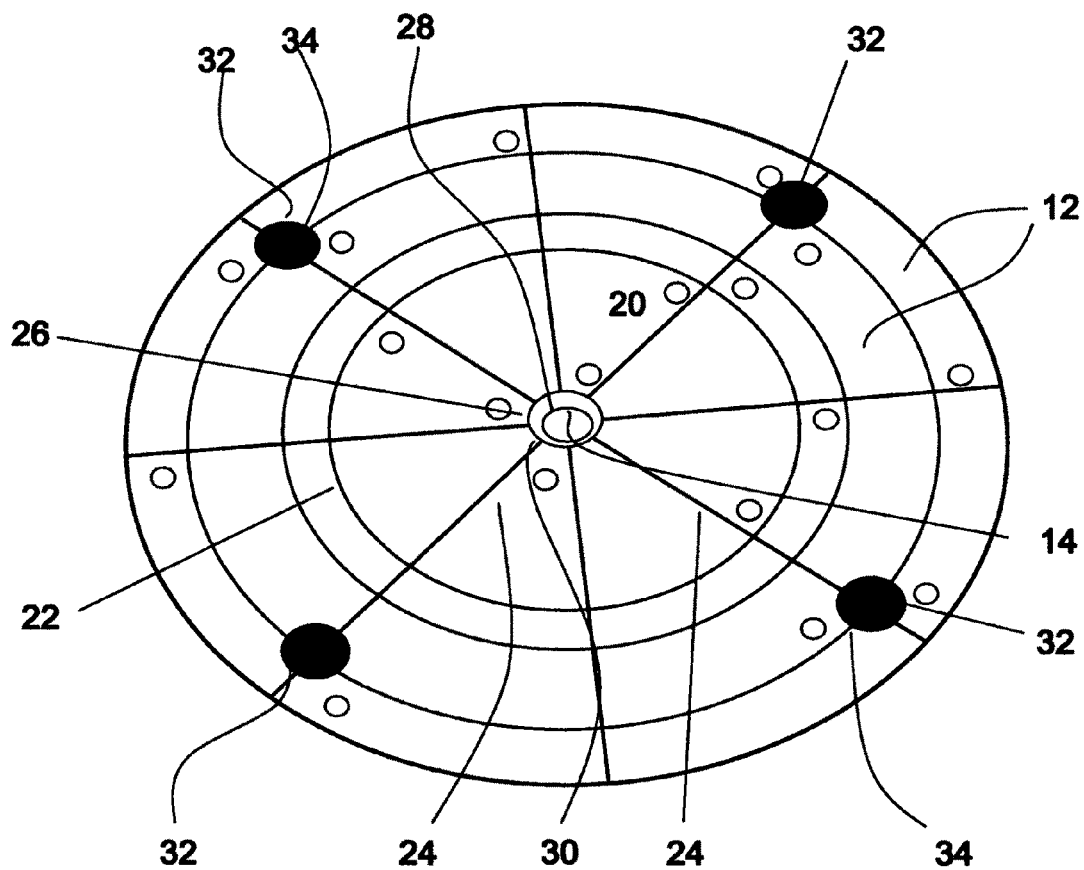
FIG. 2 is a perspective view of the bottom of the base plate.

In the preferred embodiment the diameter of the hole 14 is about ⅜ of an inch. The top surface 16 of the base plate 12 has a raised circular flange 18 on it. It is concentric to the hole 14. The purpose of the flange 18 will be described below. The preferred diameter of the base plate 12 is about 8 inches, and the circular flange 18 is preferably located about one and one quarter inches from the outer edge of the base plate 12. The flange 18 projects about ⅛ inch vertically for the surface 16 of the base plate 12. FIG. 2 shows the bottom surface 20 of the base plate 12. It has a series of concentric strengthening ribs 22 molded into it, and a number of intersecting ribs 24 which radiate out from the center of the plate 12. There is a small concentric rib 26 molded into the plate 12 at the center surrounding the hole 14. The concentric rib 26 defines a circular space 28 with a flange 30 wide enough to receive a washer (not shown). The bottom surface 20 of the base plate 12 also has a plurality of non skid pads 32 situated at various locations close to the edge of the plate 12. The non skid pads 32 are situated in recesses 34 molded into the bottom surface 20 of the plate 12. Desirably, the non skid pads 32 are located close to the edge of the bottom surface 20 of the base plate 12, and are positioned so that they provide uniform support on a flat surface to the base plate 12.

As shown in FIG. 2, there are four non skid pads 32, one located at each of the apexes of a imaginary rectangle toward the outer ends of the ribs 24 which intersect with the small concentric rib 26 surrounding the hole 14 in the plate 12. The non skid pads 32 can be made of felt, Velcro, or similar material. The number of non skid pads is variable. As shown, the base plate is circular in configuration, but the shape is substantially immaterial. That is, it could be square or rectangular, or some other shape. What is important is that it have a hole 14 at or near the center thereof, and an elevated circular flange 18 on the top surface 16.

Figure 12:
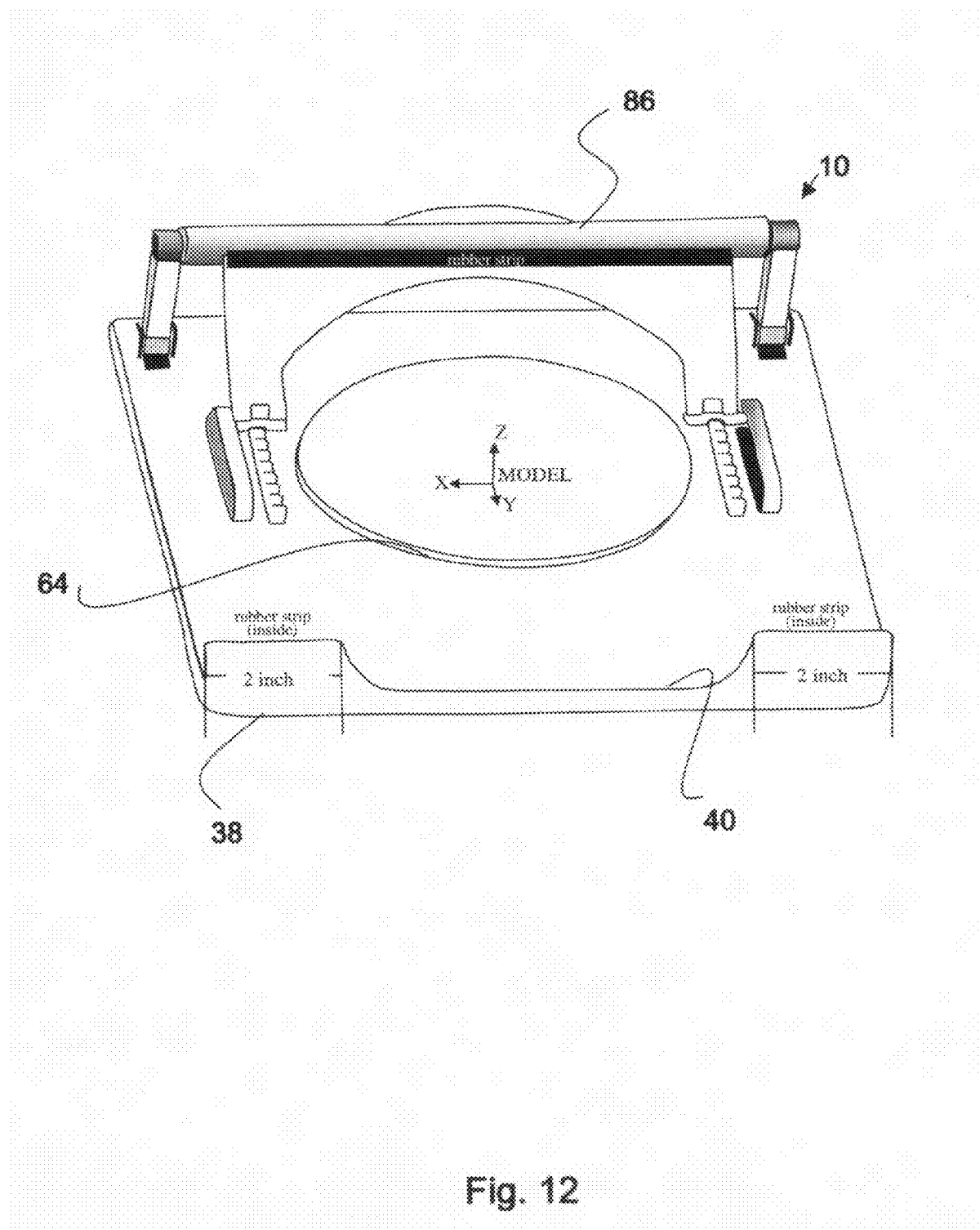
FIG. 12 is a perspective view of an alternative embodiment of the invention.

Positioned above, and overlying the base plate 12 is a support plate 36. The support plate 36, FIGS. 3, 4, 5, and 6, is generally rectangular in configuration. It has an elevated ledge 38 projecting upward at the lower end, to provide a stop for a laptop computer that may be positioned on it. That is, a laptop computer would be stopped from sliding off of the device 10 and support plate 36 by the ledge 38. As shown in FIG. 11, the ledge 38 extends across the entire width of the base. In an alternative embodiment, as shown in FIG. 12, the ledge has a gap 40 in the middle, so as to provide access to wires, connections, and the like that some laptop computers have in the front thereof. If desired, a non slip material 42 such as rubber can be applied to the face 44 of the ledge 38 to prevent sliding of a laptop computer that may be resting against it.

Figure 3:
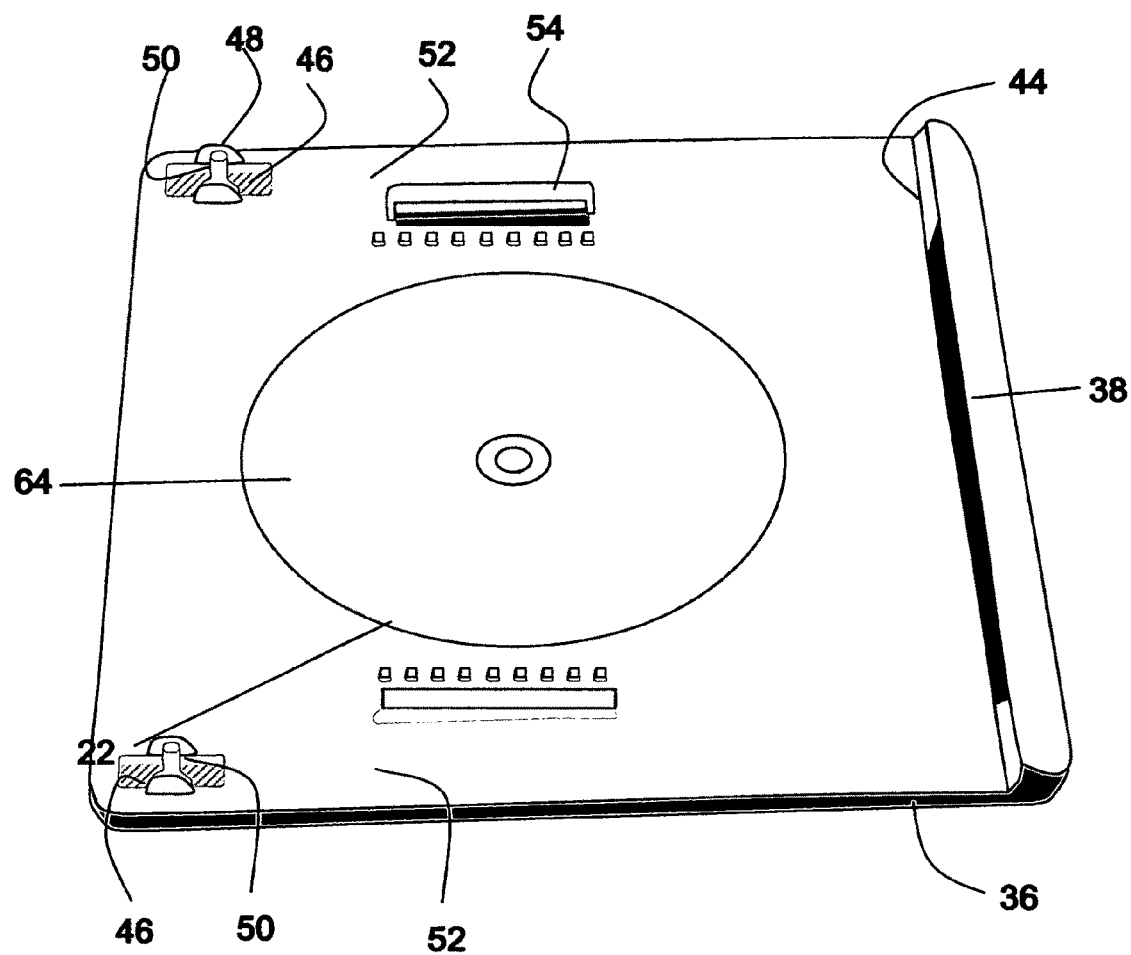
FIG. 3 is a perspective view of the top surface of the support plate.
Figure 4:
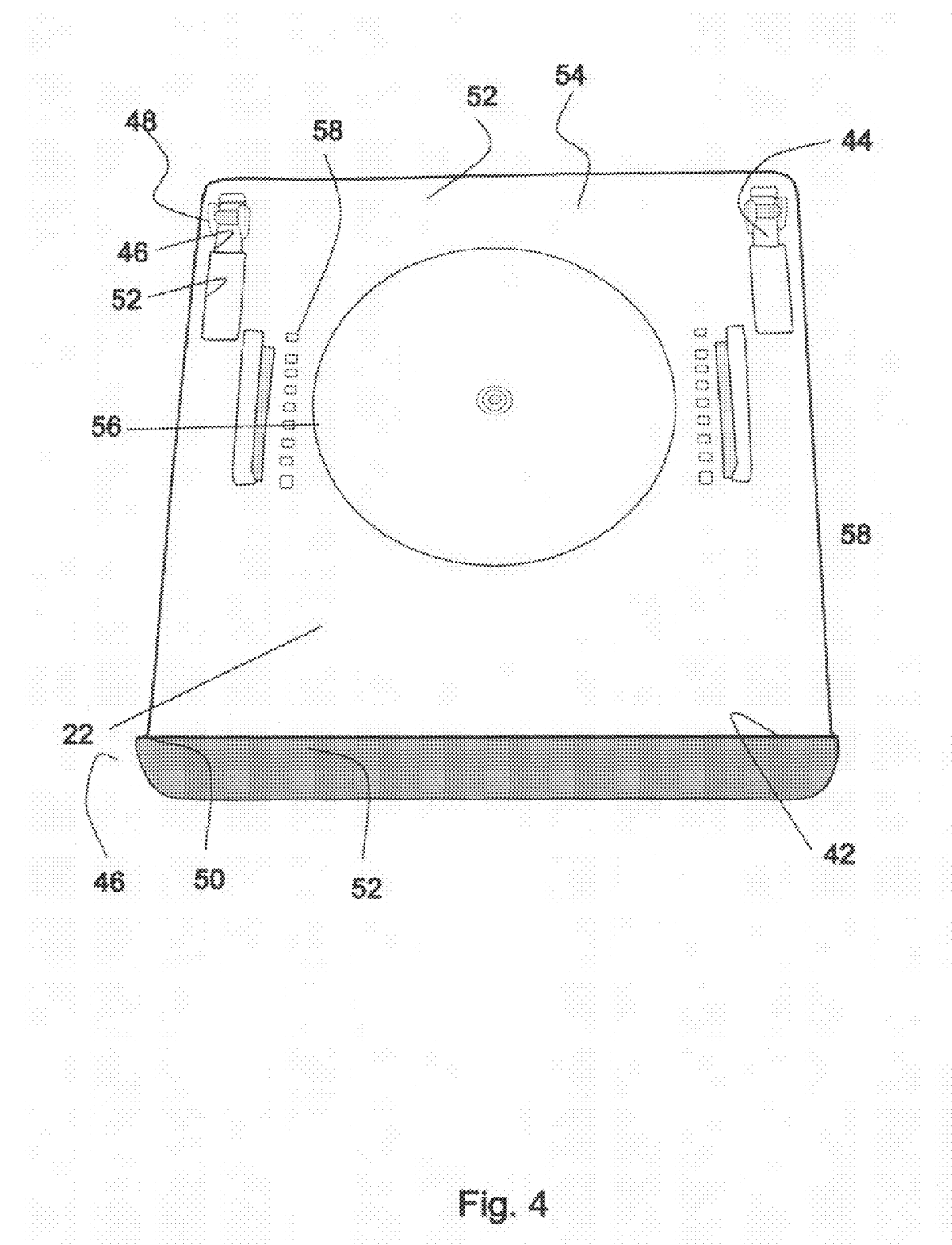
FIG. 4 is a perspective view from another angle of the top surface of the support plate.

As seen in FIGS. 3 and 4, in particular, the support plate 36 has a number of slots in it. One set of slots 46 is located at the end opposite the ledge 38. Each slot 46 has a pair of ears 48 projecting upward from the sides thereof, and a round axle 50 spanning the space between the ears 48. Below each of the slots 46 is a rectangular recessed area 52 molded into the face 44 of the support plate 36. A second pair of slots 54 is located at an intermediate point on the support plate 36 about ⅔ of the distance from the bottom edge.

Figure 9:
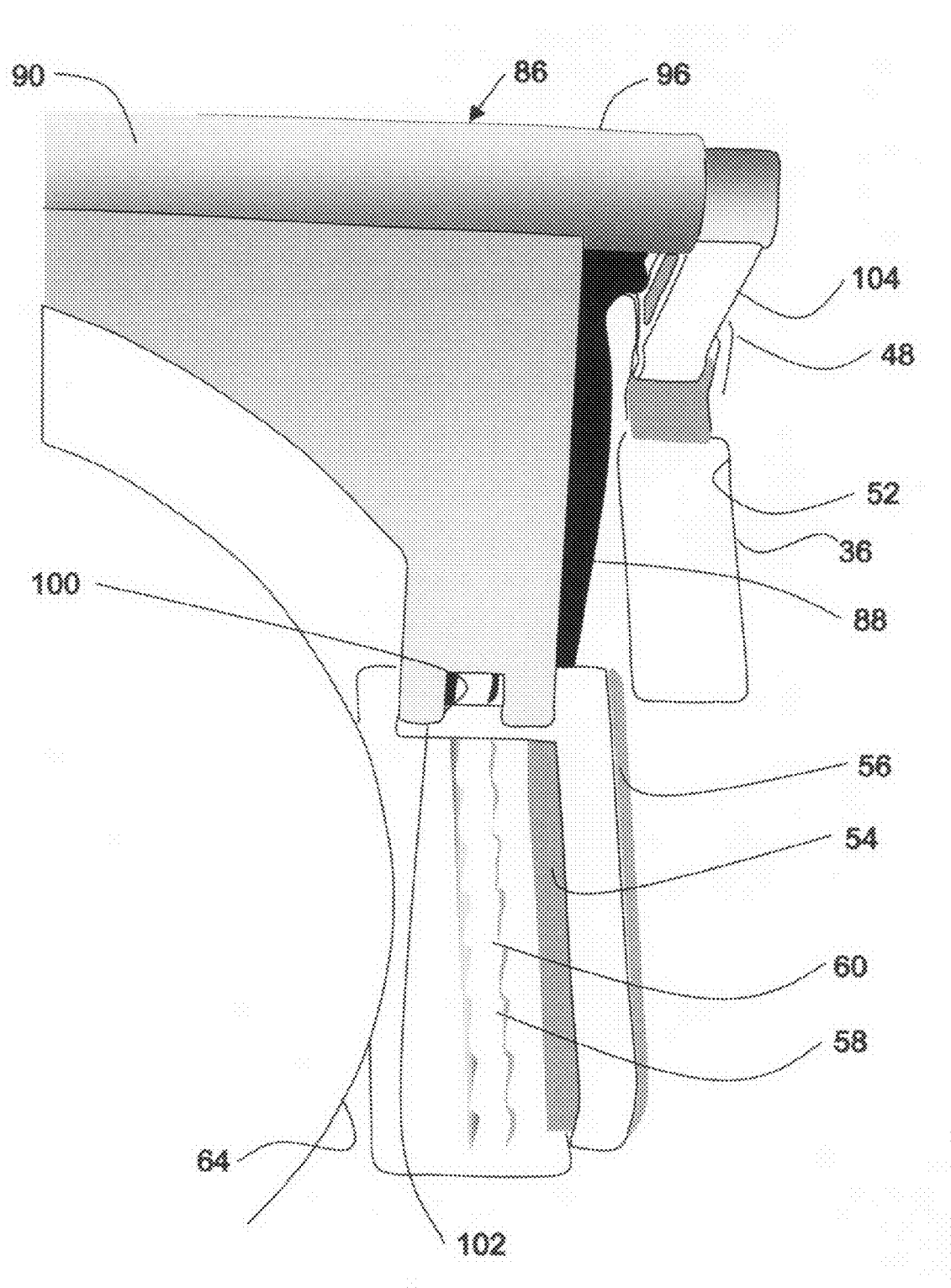
FIG. 9 is an enlarged perspective view of a portion of the device of the invention.
Figure 10:
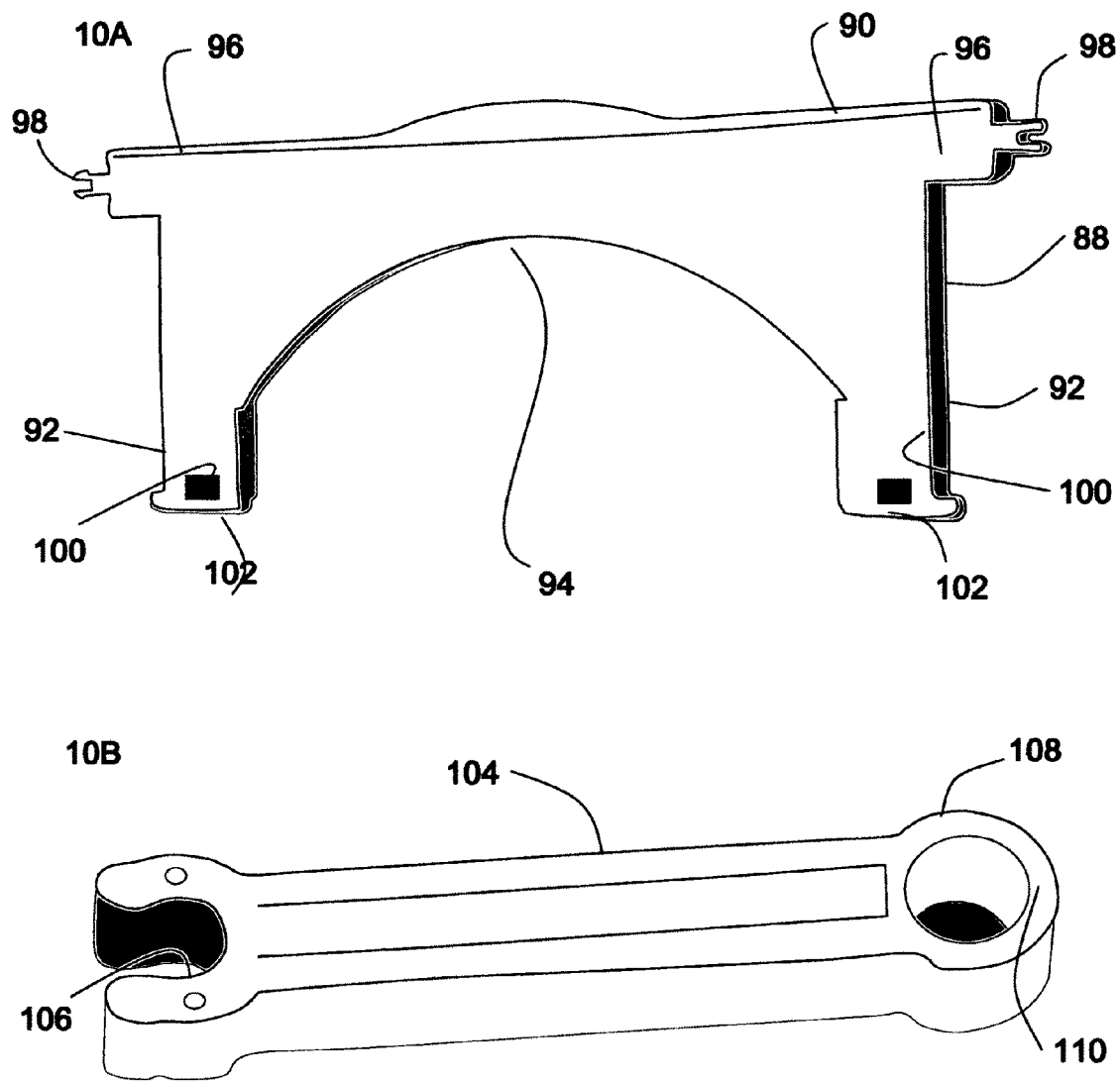
FIG. 10 A is a plan view of a component of the device of the invention.

As best seen in FIG. 9, each of the slots 54 has a cowl 56 projecting upward from the outer edge thereof, and a set of teeth 58 projecting upward adjacent the inner edge thereof. The teeth 58 are molded onto the top surface or face 44 of the support plate 36, and provide a ratchet mechanism, as will be described below. The number of teeth 58 can be variable, but preferably, there are 9 spaced apart teeth on each side of the support plate 36, and the teeth are about ⅛ inches in height. The space between the teeth 58 defines a recess 60 or groove into which an axle is situated, as described below.

The top surface 62 of the support plate 36 has a circular elevated section 64 substantially in the middle thereof, intermediate the two rows of teeth 58. The elevated section 64 has a diameter slightly larger than the diameter of the outer edge of the flange 18 on the top surface of the base plate 12.

Figure 6:
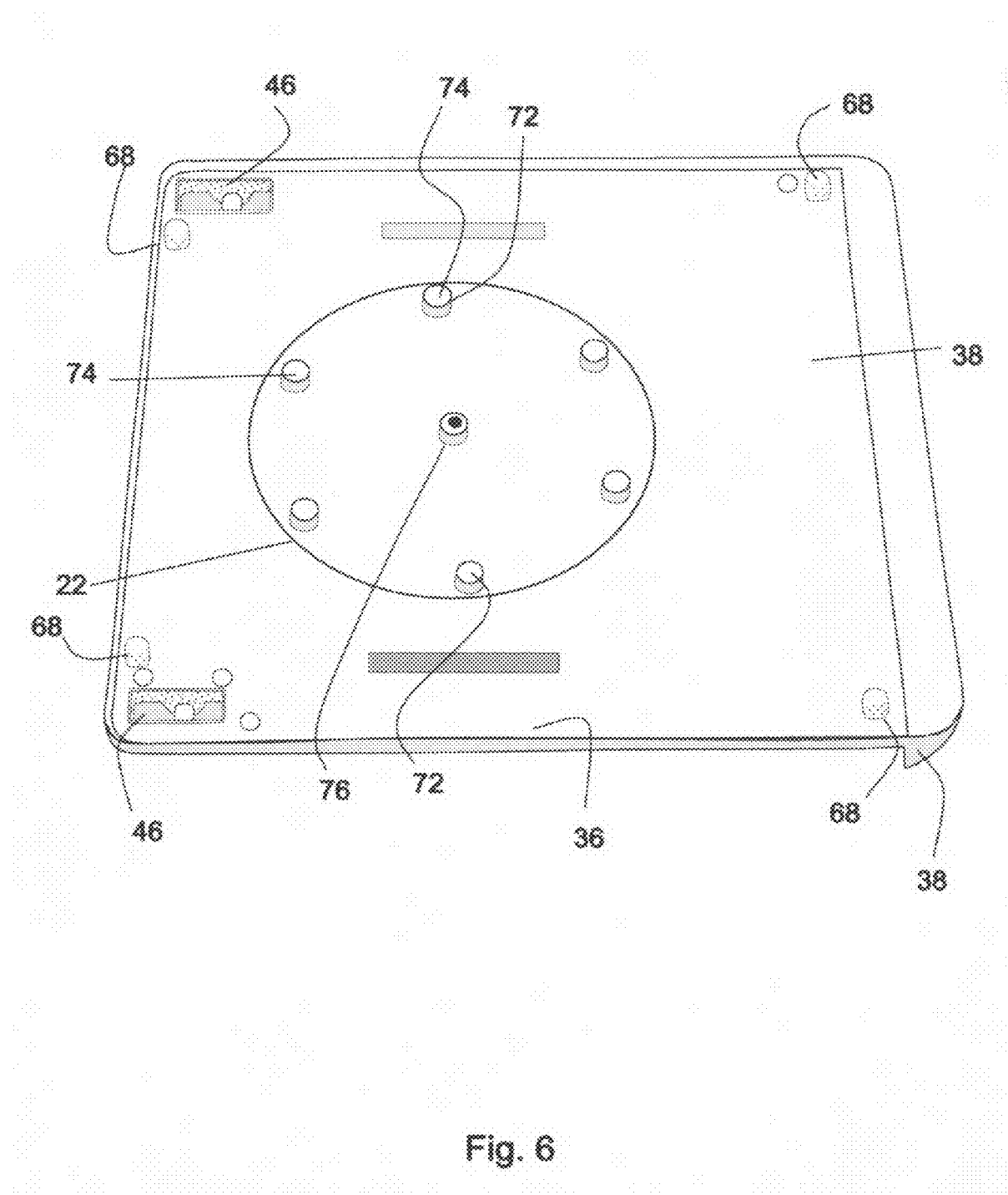
FIG. 6 is a perspective view of the bottom surface of the support plate.
Figure 7:
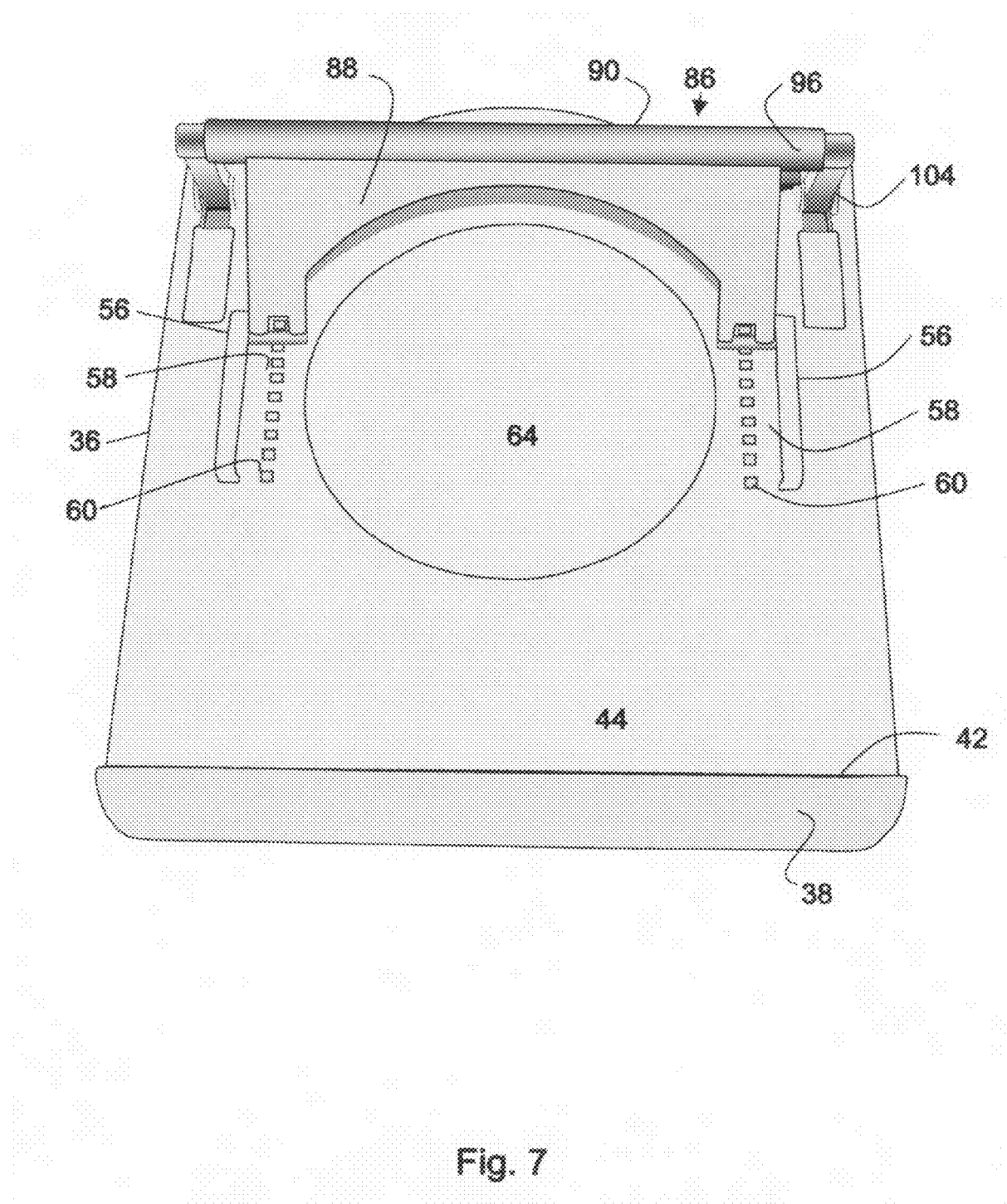
FIG. 7 is a perspective view from the top of the device of the invention.
Figure 8:
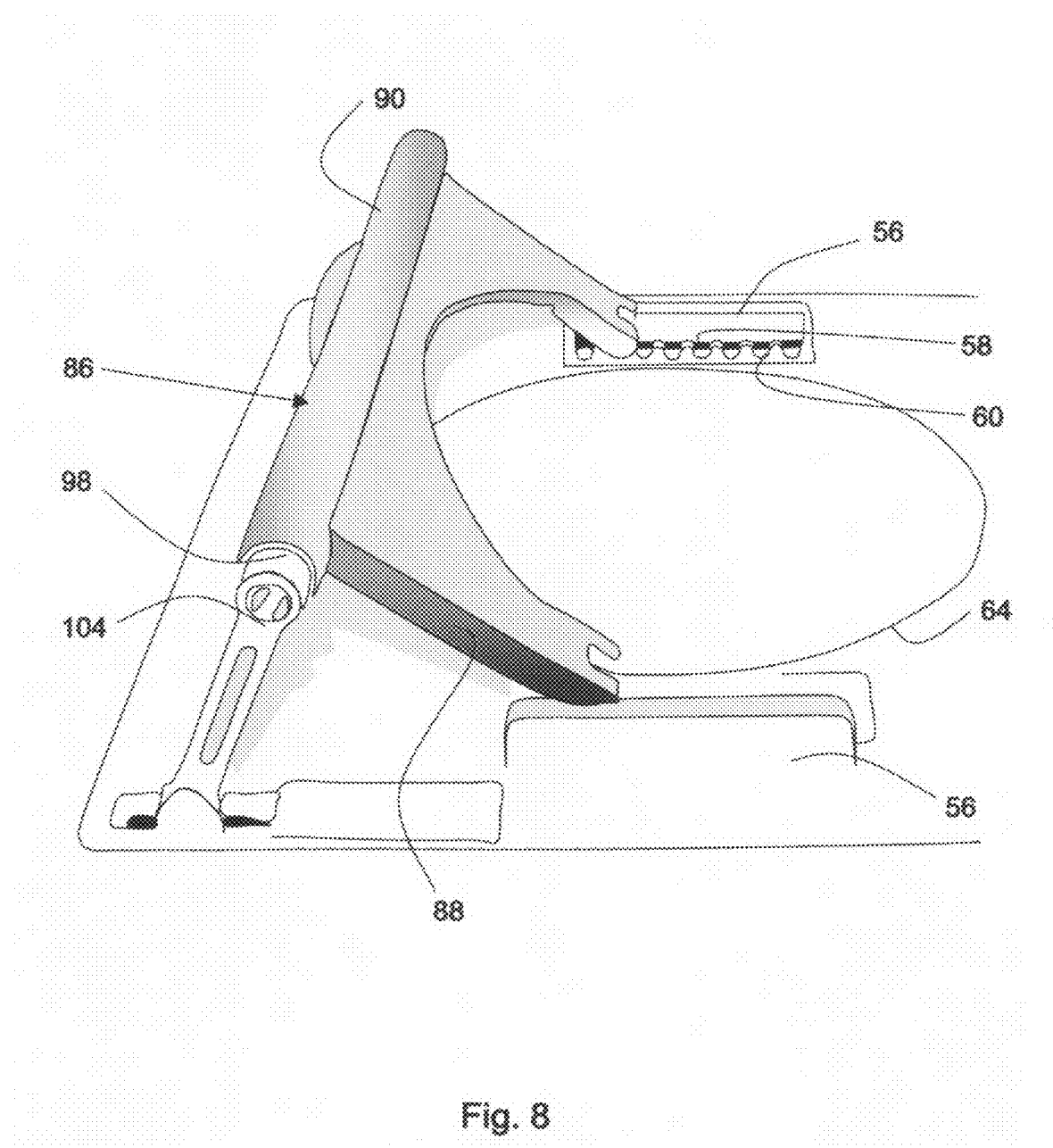
FIG. 8 is an enlarged perspective view of a portion of the device of the invention.

As seen in FIG. 6, the bottom side 66 of the support plate 36 has spacers 68 molded into the four corners thereof, and has a circular indentation 70 that corresponds in diameter to the elevated ring 64 on the surface 62 thereof. The slots 46 and 54 described above with reference to the top surface of the support plate 36 are also shown. A plurality of open faced cups 72 are molded into the bottom surface 66 of the support Plate 36, situated around the periphery of the circular indentation 70. Each of the cups 72 holds a ball bearing 74 which facilitates rotational movement of the support plate 36 on the base plate 12, as described below.

Figure 5:
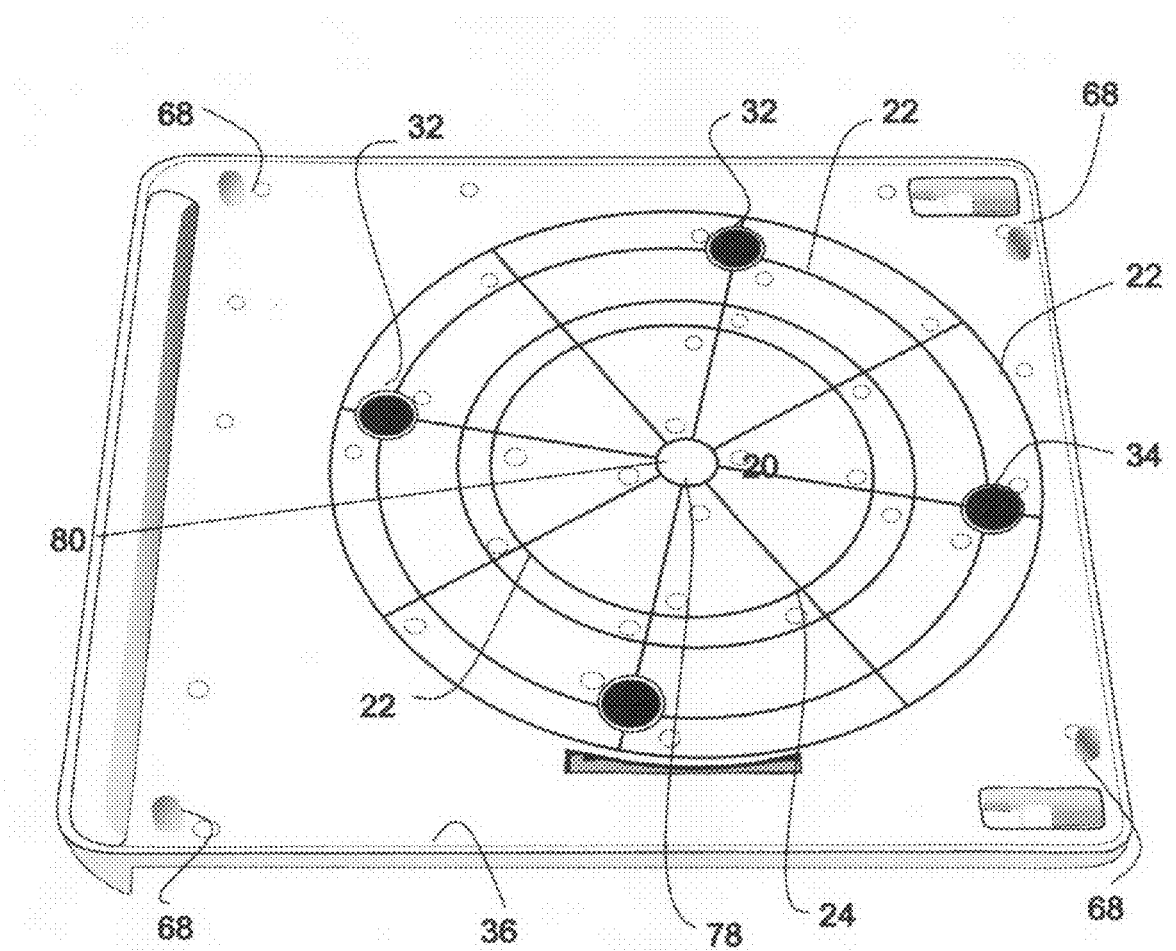
FIG. 5 is a perspective view of the bottom of the device of the invention.

A downwardly projecting screw receiving post 76 is located at the center of the indentation 70. The diameter of the post is slightly smaller than the diameter of the hole 14. FIG. 5 shows the base plate 12 mounted to the bottom of the support plate 36. The annular flange 18 on the top surface 16 of the base plate 12 fits into the indentation 70 in the bottom of the support plate 36. When properly situated, the post 76 projects through the hole 14, but is sufficiently loose so that rotation of the support plate 36 with respect to the base plate 12 can be achieved. Before the base plate 12 is fastened to the support plate 36, the ball bearings 74 are placed in the cups 72. A portion of the ball bearings 74 projects beyond the edge of the cups 72 so as to provide a movable surface against which the base plate 12 rests. The base plate 12 is affixed to the support plate 36 by a screw 78 inserted through the hole 14 and screwed into the post 76. The screw 78 is restrained from passing through the hole 14 by a washer 80 under the head thereof which is larger than the diameter of the hole 14 and rests against the flange 30 in the recess 28. The ball bearings 74 in the cups 72 come into contact with the upper surface 16 of the base plate 12. The support plate 36 is thus rotationally moveable around the axis of the post 76 and screw 78 while the base plate 12 stays stationary. The diameter of the circular flange 18 of the base plate 12 is lightly smaller than the diameter of the indentation 70 in the bottom of the support plate 36, thus when the screw 78 is tightened, the flange 18 fits within the peripheral confines of the indentation 70, thereby restricting movement of the support plate 36, other than rotational movement.

A moveable support construct 86 is affixed to the top surface of the support plate 36. As seen in FIGS. 7, 8 9, and 10A and 10B, the construct 86 comprises an irregularly shaped essentially flat molded piece 88 having a generally straight rounded upper edge 90, and two parallel legs 92 separated by an arcuate shaped cutout 94.

The rounded upper edge 90 of the molded piece 88 has axle like extensions 96 on each side, and smaller slotted axles 98 extending therefrom. Each leg 92 has a slot 100 at the foot thereof, and an axle 102 at the very bottom thereof which extends outwardly. The axles 102 are of a size that they fit into the grooves 60 between the teeth 58, as best seen in FIG. 9.

An arm 104 attaches to the axles 98 of each side of the molded piece 88. Each arm 104 has an open mouth 106 at one end, and a head 108 with circular configuration defining a circular opening 110 at the other end. When assembled, the open mouth of the arm 104 fits over the axle 50 in the support plate 36, and engages it, while the head 108 fits over the axle 98 on the molded piece.

Thus is obtained a moveable support construct, that is rotatable about the horizontal axis of the molded piece 88 extending through axles 98 and the axis of axles 50 of the support plate 36. The axles 102 on the legs 92 of the molded piece 88, fit into the groves 60 formed between the teeth 58. Thus a type of ratchet mechanism is achieved. Depending on the degree of elevation desired, the support construct 86 can be lowered or raised vertically by repositioning the axles 102 at the bottom of legs 92 in the grooves 60 formed between the teeth 58. The legs 92 are held in place by the ends of the axles 102 extending into the space formed under the cowl 56. When fully extended, the construct 86 lays essentially flat against the support plate 36, thus enabling the device 10 to be placed in a briefcase or laptop carrier, and easily transported.

A laptop computer or other device placed on the device of the invention can be moved in a rotational direction, or one end elevated in a vertical direction, or both, as desired. The degree of elevation is controlled by the moveable support construct 86, which can be raised or lowered vertically by repositioning the axles 102 in the grooves 60 between the teeth 58, as shown in FIG. 9. Thus the angle of a laptop keyboard resting on the device 10 can be easily adjusted by rotating the support plate 36 on the base plate 12, or raising the rounded upper edge of the support construct 86 to the desired height, or both.

An added advantage is that the device of the invention enables air to circulate freely around and underneath a computer, thus preventing excessive heat buildup, and thereby increasing battery life.

While this invention has been described with reference to a preferred embodiment, it should be understood by those skilled in the art that various changes and modification may be made and equivalents may be substituted for elements thereof without departing from the scope of the invention. Therefore, it is intended that the invention not be limited to the particular embodiment disclose as the best mode contemplated for carrying out the invention, but that the invention will include all embodiments falling within the scope of the appended claims.

I claim:

1. A computer support device comprising:
   a. a base
   b. a support plate attached to said base capable of horizontal rotational movement around the vertical axis of said base, and c. a moveable support construct attached to the top surface of said support plate capable of vertical movement relative thereto, wherein said construct comprises a pair of spaced apart parallel arms having lower and upper ends, and an irregularly shaped molded piece positioned therebetween, each of said arms at its lower end being rotably attached to said support plate, and at its upper end rotably attached to said irregularly shaped molded piece, the axis of rotation in the first instance being in the plane of the top surface of the support plate, and in the second instance parallel thereto.

2. A computer support device comprising:

a. a base b. a support plate attached to said base capable of horizontal rotational movement around the vertical axis of said base, the top surface of said support plate having a parallel row of teeth with intervening grooves positioned on it, one row on each side of the plate parallel to the edge thereof, and c. a moveable support construct attached to the top surface of said support plate capable of vertical movement relative thereto, wherein said construct comprises a pair of spaced apart parallel arms having lower and upper ends, and an irregularly shaped molded piece positioned therebetween, said irregularly shaped molded piece having a rounded upper edge, a body, and a pair of parallel legs extending from the body, said pair of parallel legs each have axles at the lower ends thereof which are positioned within the grooves between said teeth mounted on said support plate, thereby forming a ratchet mechanism.

3. The device of claim 2 wherein the height of said construct relative to the surface of said support plate is determined by the position of said axles in the grooves between said teeth.

* * * * *